United States Patent [19]
Bede

[11] 3,750,986
[45] Aug. 7, 1973

[54] AIRCRAFT PANTS STRUCTURE

[76] Inventor: James R. Bede, 355 Richmond Rd., Richmond Heights, Ohio 44143

[22] Filed: Feb. 11, 1971

[21] Appl. No.: 114,658

[52] U.S. Cl. .......................................... 244/103 R
[51] Int. Cl. .......................................... B64c 25/16
[58] Field of Search ..................... 244/103 R, 103 S, 244/102 R, 100 R, 101

[56] References Cited
UNITED STATES PATENTS
2,538,389   1/1951   Smith ............................ 244/103 R

FOREIGN PATENTS OR APPLICATIONS
394,423   7/1924   Germany ......................... 244/103 R
847,813   10/1939   France ............................ 244/102 R

*Primary Examiner*—Milton Buchler
*Assistant Examiner*—Paul E. Sauberer
*Attorney*—Meyer, Tilberry & Body

[57] ABSTRACT

A wheel pants structure is provided for aircraft having landing gear including wheel and axle means which are supported in a substantially fixed position relative to the aircraft fuselage. The pants structure is in the form of a housing defined by fixed wall means having an opening therein adapted to be closed by a pair of pivotal door elements. The housing means including the fixed wall means and the door elements is adapted to completely enclose the wheel when the door elements are in the closed positions thereof. When the door means are moved to the open positions thereof, a portion of the wheel means is exposed for engagement with an underlying support surface for the aircraft. The door means may be moved between the open and closed positions thereof mechanically, electrically, hydraulically or pneumatically and may be actuated either manually from within the aircraft cabin or automatically.

15 Claims, 5 Drawing Figures

PATENTED AUG 7 1973

INVENTOR.
JAMES R. BEDE
BY
Meyer, Tilberry & Body
ATTORNEYS.

INVENTOR.
JAMES R. BEDE
BY
Meyer, Tilberry & Body
ATTORNEYS.

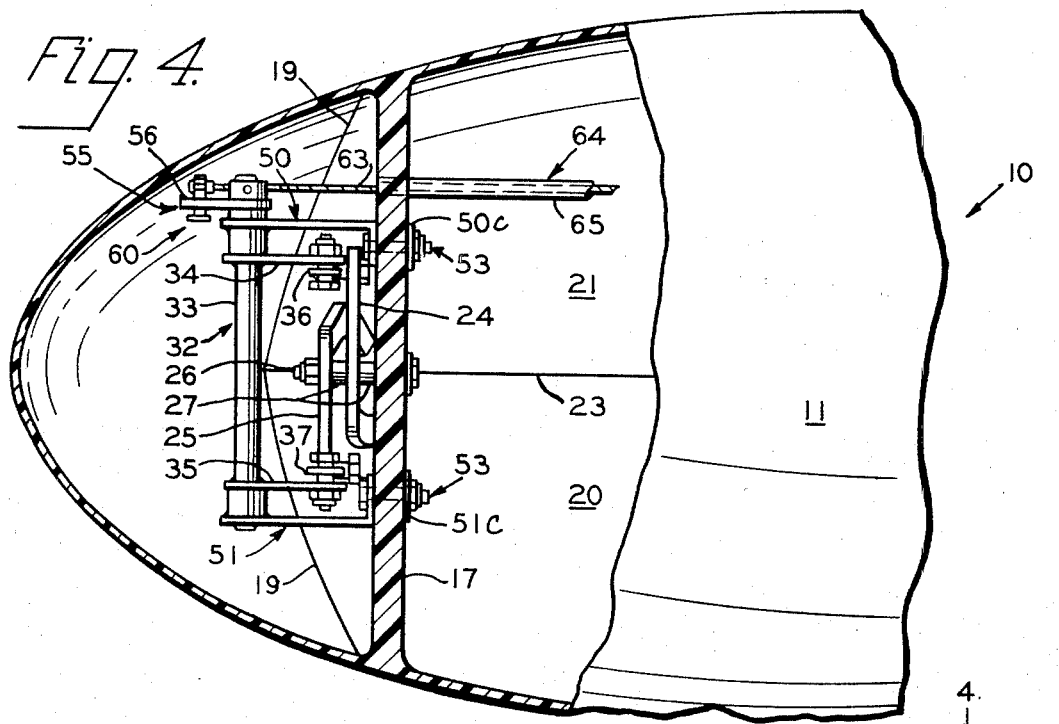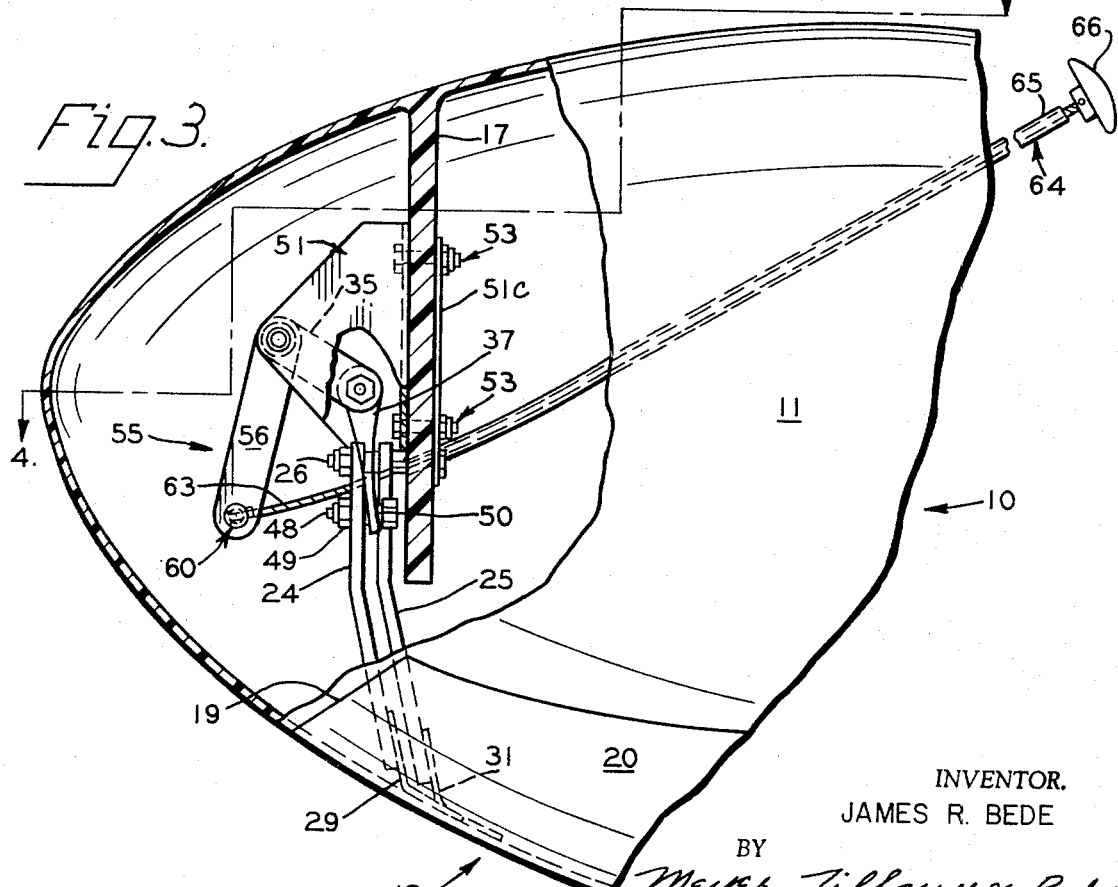

AIRCRAFT PANTS STRUCTURE

This invention relates to the art of aeronautics and, more particularly, to pants structures for aircraft having landing gear including wheel and axle means.

Pants structures have been provided heretofore to partially cover the wheel elements of aircraft having landing gear which is substantially fixed relative to the aircraft as opposed to being retractable relative to the aircraft. Such pants structures are provided for decorative purposes and, more importantly, to lessen the wind resistance which is encountered during flight of an aircraft having wheels which are uncovered. Such wind resistance not only reduces the speed of the aircraft but also causes undesirable vibration of the aircraft during flight. In an effort to achieve a minimum amount of wind resistance, these pants structures usually are aerodynamically contoured and conform in width and heighth as closely as possible to the width and heighth of the wheel of the aircraft. The bottom of the pants structures heretofore known include an opening through which a lower portion of the wheel of the aircraft extends for engagement with an underlying support surface such as an airport runway. Thus, the wheel of the aircraft extends below the pants structure a distance sufficient to permit the aircraft to take-off and land without the pants structure coming into contact with the underlying surface.

Although pants structures of the above character do serve to lessen wind resistance and aircraft vibrations resulting from such resistance, it remains that the opening in the pants structure and the portion of the wheel extending below the pants structure limit the extent to which reduction of air resistance can be realized. In this respect, the pants housing defines a cavity in which the wheel of the aircraft is disposed and the opening in the bottom of the housing for the wheel defines an entrance into the wheel cavity for air moving along the outer surface of the housing. Thus, during flight of the aircraft, air enters the cavity in a direction substantially transverse to the line of flight of the aircraft and thus creates a turbulence of air which both imparts vibration to the aircraft and resists forward movement of the aircraft. Accordingly, there is a loss of aircraft speed and an additional amount of work must be performed by the aircraft engine in order to maintain a desired speed. Vibration, of course, is both detrimental to aircraft structural components and undesirable from the standpoint of pilot and passenger comfort.

The present invention advantageously overcomes the disadvantages of prior pants structures, including those specifically pointed out above. In this respect, the present invention provides a pants structure which is adapted to completely enclose the wheel of the aircraft during flight thereof, whereby there is no wheel exposure or pants cavity opening in the path of the airstream traveling along the pants housing. Further, the pants structure preferably is aerodynamically contoured, whereby the least possible resistance to air flow therealong is achieved. In actual test flights of aircraft employing the present invention, an increase in air speed of approximately 10% has been realized.

More particularly, the present invention contemplates providing a wheel pants structure in the form of a housing adapted to completely enclose the wheel element of an aircraft and in-cluding wall means which are movable so as to open the pants structure to expose a portion of the wheel for engagement with an underlying support surface, thus to permit take-off and landing operations of the aircraft. Once the aircraft is airborne, the wall means is moved to close tha pants structure and thus enclose the wheel element completely within the aerodynamically contoured pants housing. When it is desired to land the aircraft, the wall means is moved to open the pants structure. Movement of the wall means between the two positions thereof may be achieved by means controllable from the cockpit or cabin of the aircraft, or may be controlled automatically by means responsive to air speed, whereby the movable wall means open and close as the aircraft reaches a predetermined air speed during ascent and descent flight.

It is accordingly an outstanding object of the present invention to provide a pants structure for aircraft landing gear which is adapted to completely enclose the aircraft wheel and thus reduce air resistance to flight of the aircraft.

Another object of the present invention is the provision of a wheel pants structure of the character mentioned above which provides for an aircraft to obtain a higher maximum speed than heretofore possible.

A further object is the provision of pants structure of the character mentioned above which reduces air resistance to flight of an aircraft and thus reduces the amount of work required of the aircraft engine to propel the aircraft at a given speed.

A further object of the present invention is the provision of pants structure of the above character including housing means adapted to completely enclose the wheel of the aircraft during flight thereof and adapted to be opened to expose a portion of the aircraft wheel for the latter to engage an underlying support surface during take-off and landing operations of the aircraft.

Yet another object of the present invention is the provision of a pants structure of the character mentioned above which is adapted to be actuated by the pilot of the aircraft from within the aircraft, or automatically in response to aircraft speed.

Still a further object is the provision of door means and door actuating means for a pants housing having a bottom opening, the door means and actuating means being readily mountable on a pants housing and operable for the doors to cooperate with the housing to completely enclose the aircraft wheel and to uncover the opening and thus expose the wheel for engagement thereof with an underlying support surface.

These objects will in part be obvious and in part more fully pointed out hereinafter in conjunction with the description of the drawing which illustrates a preferred embodiment of the invention and in which:

FIG. 3 is a side elevation view, partially in section, of a portion of the pants structure of FIG. 1 and illustrating the pants door operating mechanism in detail;

FIG. 4 is a plan view of the door operating mechanism of FIG. 3 taken along the line 4—4 of FIG. 3.

Figure 1:
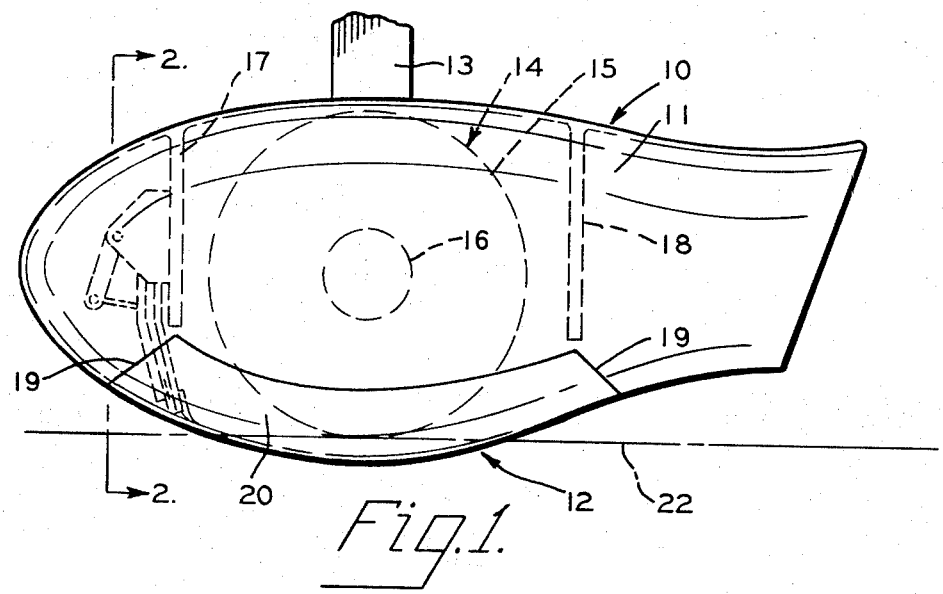
FIG. 1 is a side elevation view of a pants structure of the present invention.

With reference now in particular to the drawing wherein the showings are for the purpose of illustrating the preferred embodiments of the invention only and not for the purpose of limiting the same, there is illustrated a pants structure including housing means 10 which includes fixed wall means 11 and movable wall means 12. The landing gear of the aircraft includes a landing gear strut 13 which supports wheel and axle means 14 including wheel means indicated generally by a broken line 15 and axle means indicated generally by a broken line 16 in FIGS. 1 and 2 of the drawing. All of the structural details concerning the wheel and axle means are not pertinent to the present invention. The axle may, for example, include an enlargement 16a at one end thereof which is bolted or otherwise suitably secured to strut 13. The term wheel means in this instance is intended to include both the wheel rim and a tire component mounted thereon. Landing gear strut 13 is suitably attached to the body or wing of an aircraft in any manner well known in the art and, again, the structural details with regard to the strut mounting are not pertinent to the present invention. Fixed wall means 11 is suitably attached to landing gear strut 13 so that the position of fixed wall means 11 and thus the pants structure as a unit is substantially fixed relative to wheel and axle means 14. The mounting of the pants structure to the strut may be achieved in any well known manner and the details of such mounting are not pertinent to the present invention. Mounting may be achieved, for example, by means of flange or bracket elements A secured to strut 13 and axle 16 by means of bolts B and fastened to wall means 11 such as by rivets C.

Fixed wall means 11 is aerodynamically contoured longitudinally and laterally and is provided internally with structural bulkheads 17 and 18 disposed forwardly and rearwardly of wheel means 15 respectively. Fixed wall means 11, movable wall means 12 and bulkheads 17 and 18 may be of any suitable material such as fiberglass, plastic, sheet metal, thermoplastic, compressed fibrous material, or the like. Preferably, wall means 11 and 12 are vacuum formed fiberglass, approximately 0.060 inch thick, and bulkheads 17 and 18 are fiberglass components approximately 0.5 inch thick suitably bonded to wall means 11. Wall means 11 and 12 of the pants housing means may, of course, be provided with an external contour other than the particular contour illustrated in the drawings.

Wall means 11 is provided with an opening in the bottom thereof having a peripheral edge 19. The opening is adapted to be selectiVely covered and uncovered by movable wall means 12 which, in the particular embodiment illustrated, is defined by door means 20 and 21. Each of the door means is in the form of a panel element supported, in a manner more fully pointed out hereinafter, for pivotal movement relative to fixed wall means 11. When the door panels are in the closed position relative to fixed wall means 11, as illustrated in the drawing, the panels together define a housing portion underlying wheel means 15 so that the wheel means is completely enclosed in the housing. When the door panels are moved to the open positions thereof as illustrated by broken lines in FIG. 2, the lower portion of wheel means 15 is exposed. It will be noted in FIGS. 1 and 2 of the drawing that when exposed the wheel means extends below peripheral edge 19 of the opening in fixed wall means 11, thus permitting engagement of wheel means 15 with an underlying support surface such as is indicated by broken line 22. It will be noted, too, that the door panels are structurally contoured so that they mate with one another along edge 23 therebetween and with peripheral edge 19 of the opening in fixed wall means 11, whereby the door panels define with one another and with fixed wall means 11 a continuous smooth contour both longitudinally and laterally of the pants structure.

Door panels 20 and 21 are supported for pivotal movement relative to fixed wall means 11 by metal lever means including door lever elements 24 and 25 mounted intermediate their opposite ends to bulkhead 17 for pivotal movement relative to the bulkhead and thus fixed wall means 11. Levers 24 and 25 preferably are mounted on bulkhead 17 by common nut and bolt means including a bolt 26 which extends through the bulkhead and through both link elements along an axis perpendicular to the axis of the wheel means 15. Preferably, lever elements 24 and 25 are spaced apart from bulkhead 17 and from one another by sleeve elements 27 disposed between the levers and between lever 25 and bulkhead 17. The lower end of lever element 24 is provided with a leg 28 having a contoured surface 28a conforming with the contour of door panel 20. Leg 28 is attached to door panel 20 by strap means 29 suitably interconnected with leg 28 and door panel 20. Similarly, lever element 25 is provided at its lower end with a leg or extension 30 having a contoured surface 30a which conforms to the contour of door panel 21. Leg 30 is attached to door panel 21 by strap means 31 suitably attached to both leg 30 and door panel 21. It will be noted that lever legs 28 and 30 taper from the inner toward the outer ends thereof and terminate substantially in points adjacent the corresponding edge 19 of the opening in wall means 11. It will be further noted that each lever extends from the pivot axis defined by bolt 26 in a downward direction inclined laterally away from its corresponding door panel. This provides for the corresponding door to pivot downwardly and outwardly of wall means 11 to prevent interference between the wall means 11 and the door edges adjacent opening edge 19 during opening and closing of the doors.

Figure 2:
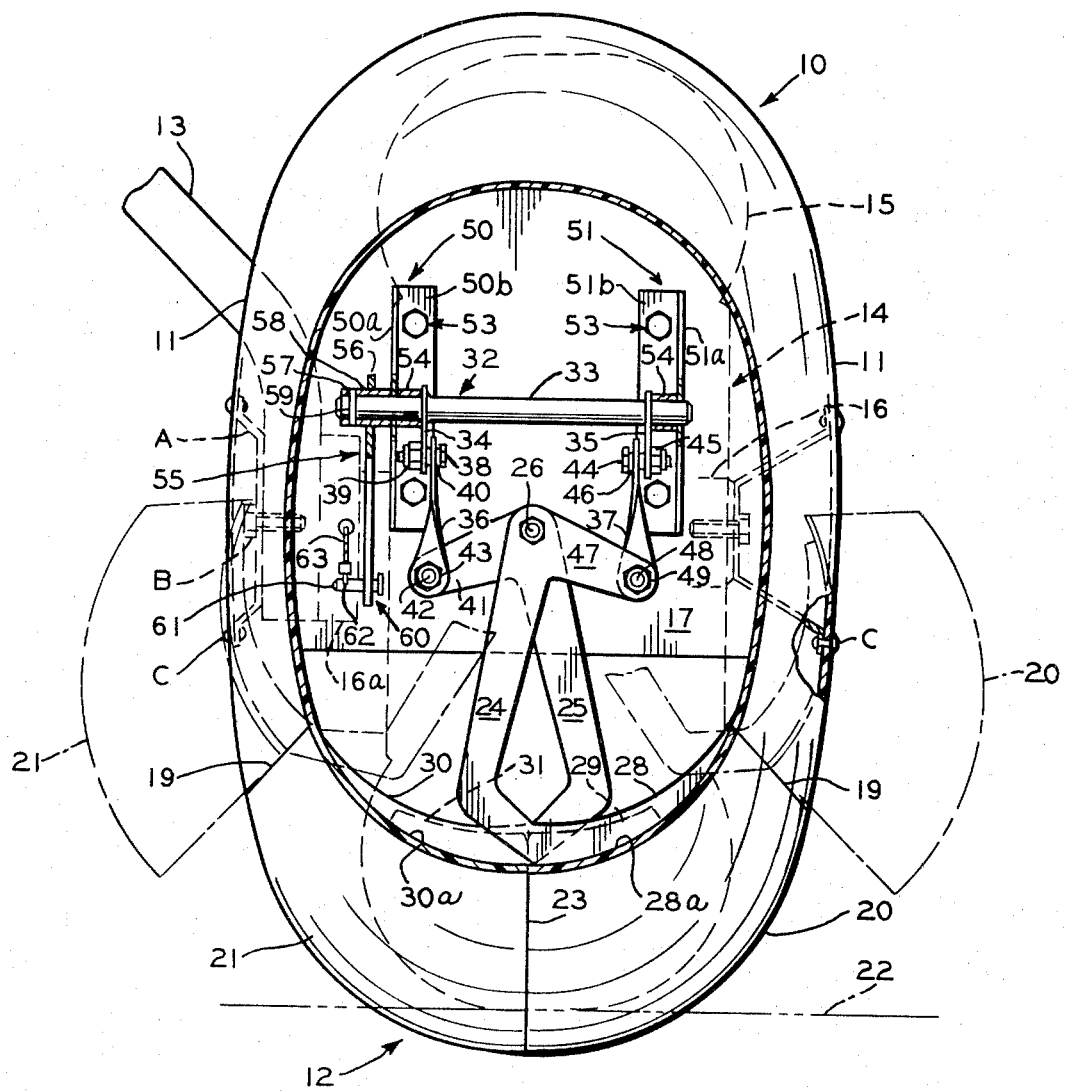
FIG. 2 is a sectional elevation view of the pants structure taken along the line 2—2 in FIG. 1.

In operation of the mechanism thus far described, pivotal movement of lever 24 counterclockwise relative to the axis of bolt 26 carries wall panel 20 counterclockwise to the open position thereof illustrated by broken lines in FIG. 2 of the drawing. Similarly, pivotal movement of lever element 25 clockwise relative to the axis of bolt 26 displaces door panel 21 clockwise of fixed wall means 11 to the dotted line position thereof illustrated in FIG. 2 of the drawing.

Lever elements 24 and 25 define the sole means by which the door panels are supported relative to the fixed wall means. Accordingly, it may be desirable in certain instances to reinforce the door panels to strengthen the latter against the effects of wind when they are open during flight and against the effects of the impact of landing. Such reinforcement may be achieved in any suitable manner such as by adding a layer of plastic foam and an additional sheet of fiberglass to the inside of the panels when they are constructed of fiberglass or the like. If the door panels are metal, reinforcement can be achieved by attaching a corrugated sheet of metal to the inside surface of the door panels.

Door panels 20 and 21 are moved to the open positions thereof by actuator means mounted on bulkhead 17 for imparting pivotal movement to door levers 24 and 25. The actuator means includes shaft and lever means 32 including shaft means 33 and lever means in the form of lever elements 34 and 35 which are axially spaced apart along the length of shaft means 33 and are suitably secured thereto, such as by welding, for pivotal movement therewith. The actuator means further includes link means in the form of link elements 36 and 37. Link element 36 is pivotally attached to the outer end of lever element 34 by means of bolt 38 and nut 39. Further, a sleeve 40 preferably is provided between the head of bolt 38 and lever 34 to maintain the head and lever spaced apart to prevent binding between the lever and link components during pivotal movement thereof. The lower end of link element 36 is pivotally attached to leg 41 of lever element 25 by means of bolt 42 and nut 43. Preferably, a sleeve 40a is provided between nut 43 and the lower end of link 36, thus to maintain nut 43 spaced from leg 41 of the lever 25 to prevent binding between link 36 and lever 25 during pivotal movement therebetween. The upper end of link 37 is pivotally interconnected with the outer end of lever element 35 by means of a bolt 44 and nut 45. A sleeve 46 is provided between the head of bolt 44 and lever 35 for the same purposes as sleeves 40 and 40a, mentioned above. The lower end of link element 37 is pivotally interconnected with leg 47 of lever element 24 by means of a bolt 48 and nut 49. A sleeve 50 is provided between leg 47 and lever 24 and the head of bolt 48, for the same purpose as pointed out hereinabove with regard to sleeves 40, 40a and 46.

It will be noted that the lower end of link element 36 is disposed on the front side of leg 41 of lever 25 while the lower end of link element 37 is disposed behind leg 47 of lever 24. This relationship between the link means and levers is desirable since levers 24 and 25 are axially spaced apart relative to bolt 26, whereby lever legs 41 and 47 are axially offset relative to one another. By disposing the lower ends of the links as described above, the links advantageously are maintained in alignment with one another and are oriented vertically in a manner whereby binding between the links and the levers 24 and 25 is avoided.

Shaft and lever means 32 is supported for pivotal movement relative to bulkhead 17 by bracket means 50 and 51 including corresponding support flanges 50a and 51a and mounting flanges 50b and 51b. Flanges 50b and 51b are each suitably secured to bulkhead 17 such as by bolt and nut means 53 and corresponding back plates 50c and 51c. Shaft means 33 in the illustrated embodiment is a tubular element the opposite ends of which extend through openings in flange portions 50a and 51a of brackets 50 and 51, respectively. Further, sleeves 54 are suitably attached to flanges 50a and 51a of the brackets in surrounding relationship with regard to the openings therethrough, thus to define bearing means for tubular shaft 33. Shaft means 33 is adapted to be pivoted by actuator lever means 55 including lever arm 56 having one end thereof apertured and provided with a sleeve 57 which extends from both sides of lever 56 and is suitably attached thereto such as by a weldment 58. Sleeve 57 is adapted to be received over the outer end of shaft means 33 and is removably attached to shaft means 33 such as by a locking pin 59 extending through sleeve 57 and shaft means 33. The other end of lever 56 is provided with an opening adapted to loosely receive a headed stud element 60. Stud 60 includes shank portion 61 having an opening 62 extending transversely therethrough. Opening 62 receives one end of cable means 63 of actuator cable means 64 which leads from the pants housing to the cockpit or cabin of the aircraft where it is disposed in any desired location within reach of the pilot of the aircraft. The actuator cable means is in the form of a Bowden cable and includes a casing portion 65 which is suitably secured to bulkhead 17 at one end thereof and is suitably secured to support means in the cockpit of the aircraft which support means is not illustrated. The end of cable means 63 extending from casing 65 in the cockpit of the aircraft is provided with actuating means such as knob 66 which permits the cable means to be pushed and pulled relative to casing 65, thus to actuate the door operating mechanism.

Presuming that the aircraft is airborne and that the pilot is preparing to land, actuating knob 66 is grasped and pulled, thus to pivot actuator lever 56 and shaft means 35 counterclockwise about the axis of the shaft means. Lever means 34 and 35 are thus pivoted counterclockwise about the axis of shaft means 33, whereby link elements 36 and 37 are elevated. Elevation of link means 36 causes door lever 25 to pivot clockwise about the axis of bolt 26, and elevation of link element 37 causes door lever 24 to pivot counterclockwise about the axis of bolt 26. Such pivotal movement of door levers 24 and 25 is simultaneous and results in moving door panels 21 and 22 to the open positions thereof, as described hereinabove. The lower portion of wheel means 15 is now exposed for engagement with an underlying support surface and, accordingly, the aircraft can land. Presuming now that the aircraft has left the ground on take-off, the pilot grasps operating knob 66 and pushes the knob forwardly, whereby actuator lever 56 is pivoted clockwise about the axis of shaft means 33. Lever means 34 and 35 are thus pivoted clockwise about the axis of shaft means 33, link elements 36 and 37 descend and door levers 24 and 25 are pivoted counterclockwise and clockwise respectively to move door panels 20 and 21 to the closed positions thereof.

Figure 5:
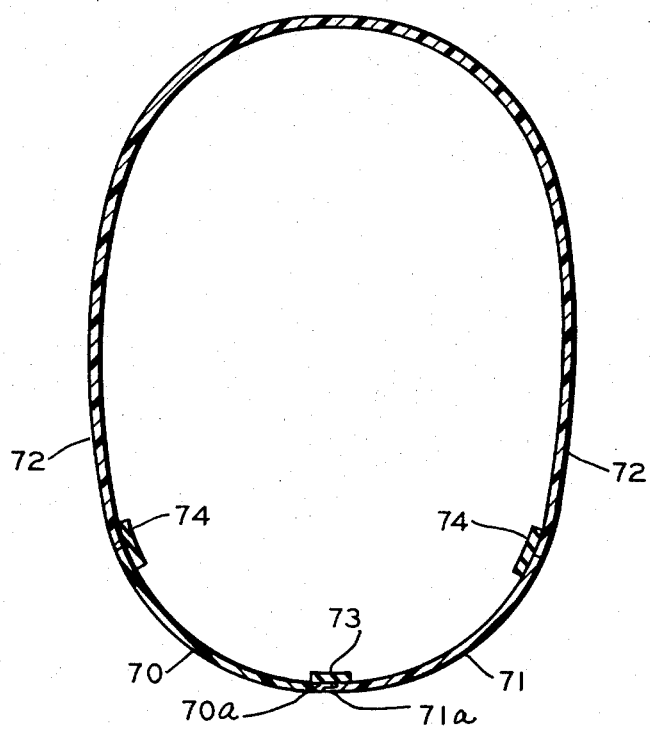
FIG. 5 is an elevation view, in section, illustrating a modification of the pants door and housing structure.

In FIG. 5 of the drawing, there is illustrated a modification of the door panel and fixed wall components of the pants structure. In this respect, door panels 70 and 71 of the pants structure are illustrated in the closed positions thereof relative to fixed wall means 72. To further seal the edges between the door panels against egress of air during flight, the panels are provided with corresponding offsets 70a and 71a which are disposed in overlapping relationship when the panels are closed. Still further, one of the panels, panel 71 in this instance, is provided with a strip of material 73 such as rubber or the like which extend across the inner edge of the joint between the door panels. The offsets and sealing strip 73 are coextensive with the length of the joint between the door panels. It will be appreciated, of course, that a joint other than offsets 70a and 71a could be provided between the door edges. For example, the edges could be beveled in opposite directions so as to overlie one another.

To still further seal the pants housing, sealing strips 74 may be provided on fixed wall means 72 to span the line of juncture between the fixed wall means and door panels. Strip 74 may be a continuous strip extending about the peripheral edge of the opening in the fixed wall means or may be defined by a plurality of strips associated end to end.

Although the actuator means described in conjunction with the embodiment herein set forth is manual actuator means in the form of a Bowden cable, it will be appreciated that actuation of the apparatus can be achieved in any number of ways. For example, an electric, hydraulic or pneumatic motor means could be Provided for imparting pivotal movement to actuator lever 56. Such motor means could be controlled from within the cockpit of the aircraft by suitable switch or valve control means operable by the pilot of the aircraft. Further, control means could be provided for any of these motor means which would be responsive to air speed of the aircraft and would thus actuate the motor means to open and close the door panels automatically and without any mental or physical action on the part of the pilot.

It will be further appreciated that linkage and lever arrangements other than those specifically described in conjunction with the embodiment herein disclosed could readily be devised and employed to achieve the door operating function. Moreover, it will be appreciated that many changes could be made in the door structures and in the pivotal relationship between the door structures and fixed wall means. In this respect, the door means could be made larger thus to expose more than just the lower portion of the wheel means when open. As a further example, the pants housing could be made in the form of a clam shell in which halves of the housing on opposite sides of a vertical line would be laterally displaceable a distance sufficient to expose the wheel means for engagement with an underlying surface. As yet another example, the door means could be in the form of elements slidable upwardly into the housing or collapsible in a manner similar to an accordion, thus in either case to be movable so as to expose the wheel means.

As many possible embodiments of the present invention may be made and as many possible changes may be made in the embodiment herein described, it is to be distinctly understood that the foregoing description is to be interpreted merely as illustrative of the present invention and not as a limitation.

I claim:

1. A pants structure for aircraft having landing gear means including axle and wheel means, comprising housing means for said wheel means, said housing means including wall means substantially fixed relative to said axle and wheel means and door means movable between first and second positions relative to said fixed wall means, said fixed wall means and said door means enclosing said wheel means when said door means is in one of said first and second positions, a portion of said wheel means being exposed to engage an underlying support surface for said aircraft when said door means is in the other of said first and second positions, means supporting said door means for pivotal movement relative to said fixed wall means, means to move said door means between said first and second positions, said door means including a pair of door elements, said means supporting said door means including door lever means for each door element, means intermediate the opposite ends of said door lever means supporting said door lever means for pivotal movement relative to said fixed wall means, and one of said opposite ends of each of said door lever means being interconnected with one of said door elements.

2. The pants structure of claim 1, wherein said means to move said door means includes means operable to substantially simultaneously pivot said door lever means to move said door elements.

3. The pants structure of claim 2, wherein said means to pivot said door lever means includes second pivotal lever means, link means between said second lever means and the other of said opposite ends of each of said door lever means, and means to pivot said second lever means for said link means to cause said door lever means and thus said door elements to pivot relative to said fixed wall means.

4. The pants structure of claim 3, wherein said means to pivot said second lever means includes pivotal shaft means, said second lever means being attached to said shaft means for pivotal movement therewith, and actuator means to pivot said shaft means including actuator control means operable from within said aircraft.

5. The pants structure of claim 4, wherein said actuator means includes an actuator lever having one end thereof connected to said shaft means and actuator cable means including cable means having one end thereof connected to the other end of said actuator lever, the other end of said cable means being connected to said actuator control means.

6. A pants structure for aircraft having landing gear means including axle and wheel means, comprising housing means for said wheel means, said housing means including wall means substantially fixed relative to said axle and wheel means and door elements movable between first and second positions relative to said fixed wall means, said fixed wall means and said door elements enclosing said wheel means when said door elements are in one of said first and second positions, a portion of said wheel means being exposed to engage an underlying support surface for said aircraft when said door elements are in the other of said first and second positions, support and actuator means for said door elements within said housing means, said support and actuator means including support plate means attached to said fixed wall means, a door lever for each door element pivotally attached intermediate its opposite ends to said plate means, one end of each door lever being connected to one of said door elements whereby pivotal movement of each door lever in opposite directions moves the corresponding door element between said first and second positions thereof, shaft and lever means mounted on said plate means for pivotal movement about an axis transverse to the pivot axes of said door levers, said shaft and lever means including a lever element corresponding to each door lever, link components between each lever element and the other of said opposite ends of the corresponding door lever, and means to pivot said shaft and lever means for said lever elements and link components to impart pivotal movement to said door levers and thus said door elements.

7. The pants structure of claim 6 wherein said door levers are pivotal about a common pivot axis.

8. The pants structure of claim 6, wherein said means to pivot said shaft and lever means includes an actuator lever having one end thereof attached to one end of said shaft and lever means and actuator cable means including cable means having one end thereof connected to the other end of said actuator lever, and cable actuator means connected to the other end of said cable means.

9. The pants structure of claim 8, wherein said support plate means is disposed in said housing means forwardly of said wheel means and in a plane substantially parallel to the axis of said wheel means.

10. The pants structure of claim 9, wherein pivotal movement of said door levers is in opposite directions with respect to said common pivot axis.

11. The pants structure of claim 10, wherein the axis of said lever and shaft means is substantially parallel to the axis of said wheel means, whereby pivotal movement of said door levers and thus said door elements is in a direction axially of said axis of said wheel means.

12. The pants structure of claim 11, wherein said door elements have edges adjacent one another when said door element are in said one of said first and second positions, and seal means on the inner surface of one of said door elements and overlying the joint between said adjacent edges.

13. The pants structure of claim 12, and sealing means on the inner surface of said fixed wall means and covering the joint between said fixed wall means and door elements when said door elements are in said one of said first and second positions.

14. The pants structure of claim 12, wherein said adjacent edges are contoured longitudinally so as to overlap one another.

15. A pants structure for aircraft having substantially fixed landing gear means including axle and wheel means, comprising housing means for said wheel means, said housing means including wall means having an opening therein having a peripheral edge, a portion of said wheel means extending below said edge, said housing means further including a pair of door elements movable to a first position to close said opening and cover said extended portion of said wheel means and movable to a second position to expose said wheel means sufficiently for said wheel means to engage a supporting surface for said aircraft, means to move said door elements between said first and second positions thereof, seal means carried by said wall means inside said housing means for covering the joint between said peripheral edge of said opening and said door elements when said door elements are in said first position, said door elements having adjacent edges overlapping one another when said door elements are in said first position, and a seal strip carried by one of said door elements on the inner surface thereof and extending beyond the corresponding edge of the door element to cover the joint between said adjacent edges of said door elements when said door elements are in said first position.

* * * * *